United States Patent Office 2,851,469
Patented Sept. 9, 1958

2,851,469
MANUFACTURE OF ETHYLENE OXIDE

Jacques Marie Abel Testard, Paris, France, assignor to Societe Anonyme des Manufactures des Glaces et Produits Chimiques de St. Gobain, Chauny & Cirey, Paris, France No Drawing. Application March 2, 1955
Serial No. 491,793

Claims priority, application France March 4, 1954

6 Claims. (Cl. 260—348)

This invention relates to the manufacture of ethylene oxide from cyclic ethylene glycol carbonate, which is solid at room temperature.

Ethylene oxide has wide use in organic synthesis and a boiling point of 12.5° C. at atmospheric pressure. For this reason it must be shipped in strong metal containers provided with valves, which represent dead weight and a considerable investment. It would be better to generate the ethylene oxide on the spot where it is to be used, except that the known methods of producing it are inefficient, very rarely reaching a yield of 90% and usually being far less efficient than that.

A known reaction for the production of ethylene oxide (German Patent 845,937) uses cyclic ethylene glycol carbonate as raw material, a substance which, even without a catalyst, when sufficiently heated, produces ethylene oxide according to the reaction:

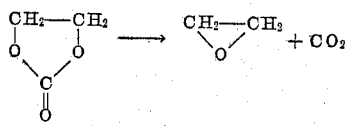

This reaction is of no industrial use because the yield of ethylene oxide is low and a large part of the raw material is transformed to solid polymers of ethylene oxide which cannot be readily transformed to the gaseous monomer. In order to remedy the defects of that process it has been proposed to use a variety of catalysts, the main purpose of which has been to direct the reaction to the production of gaseous ethylene oxide. Among such catalysts are potassium bisulfate, potassium carbonate, metallic oxides, metallic salts, silica gell, active carbon and other porous substances, which nonetheless have failed to produce a satisfactory yield of ethylene oxide monomer. Such processes have not heretofore been of industrial value.

It is an object of this invention to produce gaseous ethylene oxide monomer in a yield which is commercially satisfactory.

The objects of the invention are accomplished generally speaking by mingling cyclic ethylene glycol carbonate with a polyhalogenated hydrocarbon, having a boiling point of at least 200° C. and heating the mass to a temperature of at least 180° C. and below the boiling point of the hydrocarbon and of the cyclic ethylene glycol carbonate. In the preferred form of the invention the temperature will be maintained on the order of 200 to 210° C. and the polyhalogenated hydrocarbon catalyst will be one which has a boiling point above 210° C. Furthermore, in the preferred form of the invention the catalyst will be present in an amount on the order of 1 to 3% by weight of the cyclic ethylene glycol carbonate. The polychlorinated hydrocarbons having a boiling point sufficiently high to prevent them from being vaporized at the temperature of the reaction form a preferred class. The hydrocarbons halogenated with bromine, iodine and fluorine may also be used, but they are more expensive and not always as satisfactory.

Experience has shown that the polychlorinated hydrocarbons are useful as a class without distinction. For example, hexachloroethane which is aliphatic, hexachlorocyclohexane which is cyclic, the tetrachloronaphthalenes, having conjoined rings, containing benzene nuclei, are all useful. It is apparent that the polychlorohydrocarbons possess this catalytic property in general, when heated to the reaction temperature in contact with cyclic ethylene glycol carbonate. Furthermore, the number of halogen atoms presents does not appear to materially affect the catalytic power of the polyhalogenated hydrocarbon. For example, not only is pentachlorobutane useful, but decachlorobutane is equally so.

The proportion of catalyst employed has an influence on the yield of the reaction. For example, in the case of hexachlorocyclohexane, the yield rises from 78.5% to 99% when the proportion of catalyst is raised from .1 gram per gram molecule of cyclic ethylene glycol carbonate to 1 gram per gram molecule, but the yield falls from 99% to 81% when the proportion of this catalyst is raised to 5 grms. per gram molecule and a further decrease to 73% yield occurs when the proportion of this catalyst is raised to 10 grms. per gram molecule. There is thus, an optimum quantity of catalyst which is at about 1 gram per gram molecule for hexachlorocyclohexane, and which may differ somewhat for other catalysts, but which generally falls about 1 to 3% by weight of the cyclic ethylene glycol carbonate used. The optimum ratio can readily be determined for each catalyst by starting with those proportions which are optimum for hexachlorocyclohexane and introducing such variations as are necessary to produce the optimum yield.

In all cases the release of ethylene oxide in accordance with the invention is smooth and commences at a temperature on the order of 180° C., varying somewhat with the degree of purity of the glycol carbonate. The temperature of the reaction does not tend to change itself during the reaction unless the heating is altered. By removing the heat one immediately stops the reaction, which may again be started by applying more heat.

By increasing the temperature above 180° there is a certain tendency to increase the release of ethylene oxide, but the temperature should always be kept below the boiling point of the glycol carbonate (238° at 760 m./m.). When it is desired to still further increase the release of ethylene oxide it suffices to increase the quantity of glycol carbonate and catalyst employed, while maintaining the temperature below the boiling point of the glycol carbonate, and of course, utilizing a halogenated hydrocarbon having a boiling point above the temperature used.

It has been established that by raising the temperature one not only increases the yield of gases but also the overall yield of the decomposition reaction. For example, if one heats 1 gram molecule of cyclic ethylene glycol carbonate with 1 gram of hexachlorocyclohexane at a temperature of 190 to 200° C., the total yield of gaseous products at the end of 24 hours is 93% (ethylene oxide and carbon dioxide), the percentage being based on that which is theoretically produced by the complete transformation of the glycol carbonate according to the reaction hereinabove, but if the temperature is raised to 200 to 210° one obtains 99% of ethylene oxide and carbon dioxide after 17 hours, the amounts of ethylene oxide and carbon dioxide being in the proportions indicated by the theoretical reaction hereinabove.

After the reaction the ethylene oxide is found mixed with an equal volume of $CO_2$. In most cases it is unnecessary to separate the ethylene oxide from the carbon dioxide which accompanies it, as the carbon dioxide is chemically neutral toward those compounds with which ethylene oxide is normally reacted. However, methods of separating carbon dioxide from ethylene oxide are well known and are quite satisfactory and can be used if desired.

The following examples illustrate the invention:

Example 1

In a reaction vessel provided with a refrigerating means and a mechanical agitator there was introduced 88 grms. of cyclic ethylene glycol carbonate (1 mol.) and 1 gram of hexachlorocyclohexane. The mass was heated rapidly and the decomposition of the glycol carbonate began at about 180° C., but the temperature was raised until the best rate of decomposition was attained, which occurred between 200 and 210°, which was maintained until the evolution of gas ceased. The operation took 17 hours, throughout which the evolution of ethylene oxide was perfectly regular. The loss in weight resulting from the emission of the mixture of equal parts of ethylene oxide and carbon dioxide was about 87 grams. The residue in the vessel was 2 grams and was composed of catalyst and ethylene oxide polymers.

The yield calculated in weight is 99% of theoretical. This is far superior to that produced by any previous process.

Examples 2 to 5

The conditions set forth in Example 1 were carried out exactly but substituting a different catalyst. No attempt was made to determine the optimum conditions for the best yield with each particular catalyst.

| Catalyst | Grams of Gas ($CO_2$+ethylene oxide) Recovered | Percentage Yield by Wt. |
|---|---|---|
| Hexachlorethane | 80 | 91 |
| Decachlorobutane | 78.5 | 89.5 |
| Pentachlorobutane | 75.5 | 86 |
| Tetrachloronaphthalene | 58 | 65 |

The invention is an improved process for preparing gaseous monomeric ethylene oxide in commercial yields by heating cyclic ethylene glycol carbonate, in the presence of a small quantity of a polyhalogenated hydrocarbon having a boiling point above 200°, as a catalyst. The reaction proceeds smoothly without violence, the release of gas is at a uniform rate, proceeds only during the application of heat and stops as soon as the heat is removed. Thus, the reaction is highly controllable and is faster and more complete than prior reactions and is substantially free of those undesirable side reactions which are characteristic of prior process.

As many apparently widely different embodiments of the present invention may be made without departing from the spirit and scope thereof, it is to be understood that the invention is not limited to the specific embodiments.

What is claimed is:

1. A method of making ethylene oxide in gaseous monomeric form that comprises mingling cyclic ethylene glycol carbonate with a catalytic quantity of a halogenated, nonpolymeric hydrocarbon having a plurality of halogen substituents, which is free of aliphatic unsaturation and has a boiling point of at least 200° C., and heating the mass to a temperature of at least 180° C. and below the boiling point of the halogenated hydrocarbon and the cyclic glycol carbonate.

2. A method of making ethylene oxide in gaseous monomeric form that comprises mingling cyclic ethylene glycol carbonate with a catalytic quantity of a chlorinated non-polymeric hydrocarbon having a plurality of chlorine substituents, which is free of aliphatic unsaturation and has a boiling point of at least 200° C., and heating the mass to a temperature of at least 180° C. and below the boiling point of the chlorinated hydrocarbon and the cyclic glycol carbonate.

3. A method of making ethylene oxide that comprises agitating cyclic ethylene glycol carbonate in contact with hexachlorocyclohexane and heating the reaction mass to a temperature range circa 200 to 210° C. until the release of gases ceases, the cyclic glycol carbonate and the hexachlorocyclohexane being present in the ratio of about one mol of the former to 1 g. of the latter.

4. A method of making ethylene oxide that comprises agitating cyclic ethylene glycol carbonate in contact with hexachloroethane and heating the reaction mass to a temperature range circa 200 to 210° C. until the release of gases ceases, the cyclic glycol carbonate and the hexachloroethane being present in the ratio of about one mol of the former to 1 g. of the latter.

5. A method of making ethylene oxide that comprises agitating cyclic ethylene glycol carbonate in contact with decachlorobutane and heating the reaction mass to a temperature range circa 200 to 210° C. until the release of gases ceases, the cyclic glycol carbonate and the decachlorobutane being present in the ratio of about 1 mol of the former to 1 g. of the latter.

6. A method of making ethylene oxide that comprises agitating cyclic ethylene glycol carbonate in contact with tetrachloronaphthalene and heating the reaction mass to a temperature range circa 200 to 210° C. until the release of gases ceases, the cyclic glycol carbonate and the tetrachloronaphthalene being present in the ratio of about 1 mol of the former to 1 g. of the latter.

References Cited in the file of this patent

UNITED STATES PATENTS

| | | |
|---|---|---|
| 2,511,942 | Prichard | June 20, 1950 |
| 2,636,040 | Bruson | Apr. 21, 1953 |
| 2,667,497 | Cline | Jan. 26, 1954 |

FOREIGN PATENTS

| | | |
|---|---|---|
| 845,937 | Germany | Aug. 7, 1952 |
| 1,100,845 | France | Apr. 13, 1955 |